(12) United States Patent
Julien

(10) Patent No.: US 6,530,564 B1
(45) Date of Patent: Mar. 11, 2003

(54) NITINOL IMPACT ABSORBERS

(75) Inventor: Gerald J. Julien, Edgewood, WA (US)

(73) Assignee: Nitinol Technologies, Inc., Edgewood, WA (US)

( * ) Notice: Subject to any disclaimer, the term of this patent is extended or adjusted under 35 U.S.C. 154(b) by 394 days.

(21) Appl. No.: 09/096,542

(22) Filed: Jun. 12, 1998

Related U.S. Application Data

(60) Provisional application No. 60/049,370, filed on Jun. 12, 1997, and provisional application No. 60/049,581, filed on Jun. 13, 1997.

(51) Int. Cl.[7] ................................................. F16F 1/36
(52) U.S. Cl. ......................... 267/147; 267/80; 267/182
(58) Field of Search ......................... 267/80, 164, 165, 267/158, 147, 148, 149, 136, 160, 182; 148/402; 428/909, 960

(56) References Cited

U.S. PATENT DOCUMENTS

| | | | | |
|---|---|---|---|---|
| 3,204,913 A | * | 9/1965 | Lawrence et al. | 267/182 |
| 4,254,978 A | * | 3/1981 | Eshelman | 293/137 |
| 4,484,955 A | * | 11/1984 | Hochstein | 148/11.5 R |
| 4,723,765 A | * | 2/1988 | Pearson | 267/64.12 |
| 5,005,678 A | * | 4/1991 | Julien et al. | 188/378 |
| 5,149,066 A | * | 9/1992 | Snaith et al. | 267/136 |
| 5,398,916 A | * | 3/1995 | Kramer et al. | 267/70 |
| 5,549,370 A | * | 8/1996 | Folsom | 267/149 |
| 5,687,958 A | * | 11/1997 | Renz et al. | 267/136 |

FOREIGN PATENT DOCUMENTS

| | | | | |
|---|---|---|---|---|
| GB | 7878 | * | 12/1909 | 267/182 |
| GB | 264757 | * | 1/1927 | 297/182 |
| JP | 406109049 | * | 4/1994 | 267/182 |

* cited by examiner

*Primary Examiner*—Jack Lavinder
*Assistant Examiner*—Xuan Lan Nguyen
(74) *Attorney, Agent, or Firm*—J. Michael Neary

(57) ABSTRACT

An impact absorber for protecting a protected item against damage or injury upon impact includes a formed metallic structure having at least one Nitinol member having a grounded portion in contact with a first structure positioned to engage the protected item, and an impact receiving portion. In one embodiment, the formed metallic structure includes a plurality of Nitinol wires connected together at opposite polar regions in the form of a wire-frame sphere. The wires in the wire-frame sphere may be superelastic austenitic Nitinol in a strained condition. A release device holds the wire-frame sphere in a collapsed condition and may be actuated to release the strained superelastic Nitinol structure to a deployed position at which the deployed superelastic Nitinol structure is positioned to engage and absorb energy from the protected item impacting the impact absorber.

20 Claims, 16 Drawing Sheets

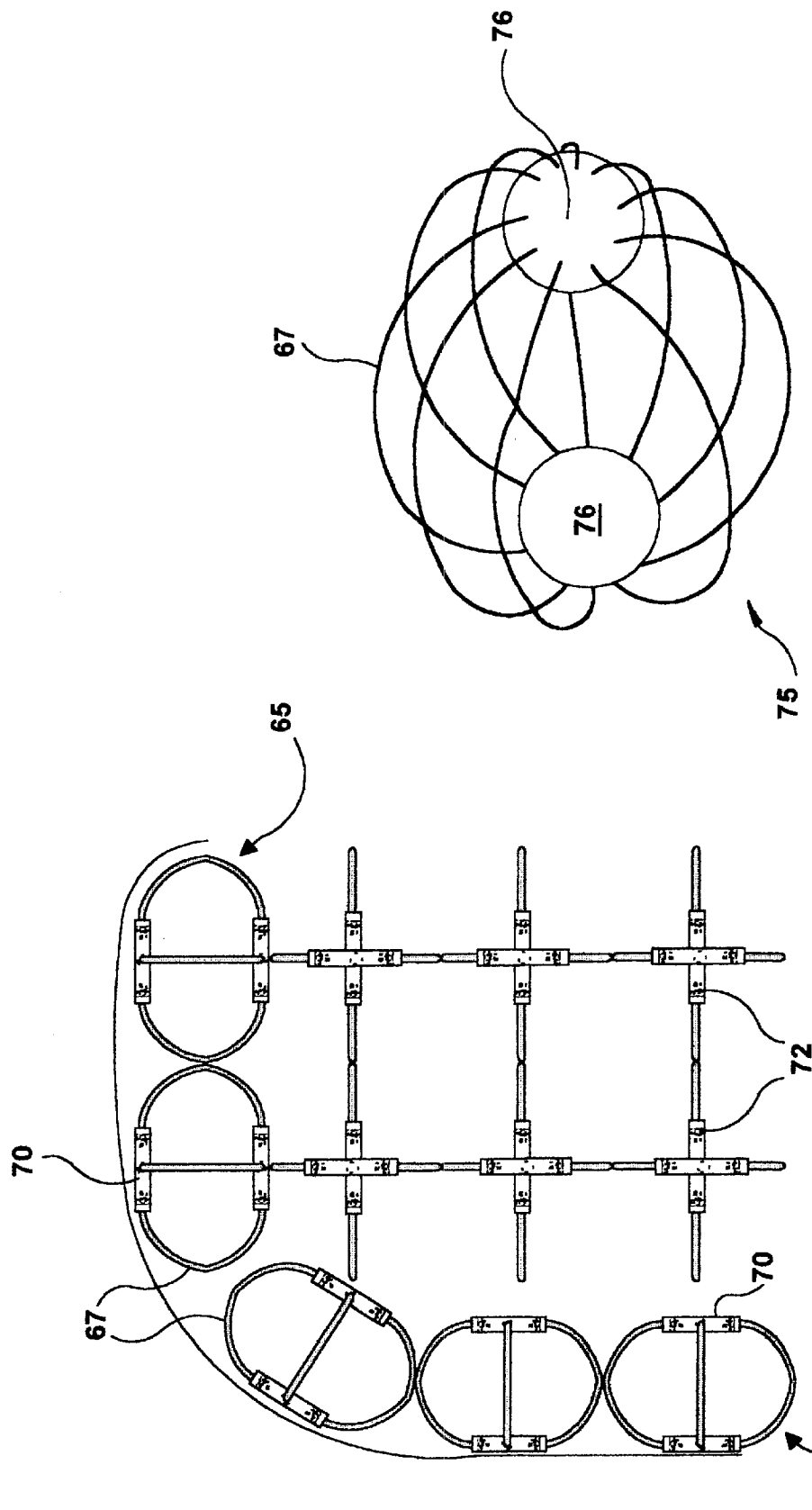

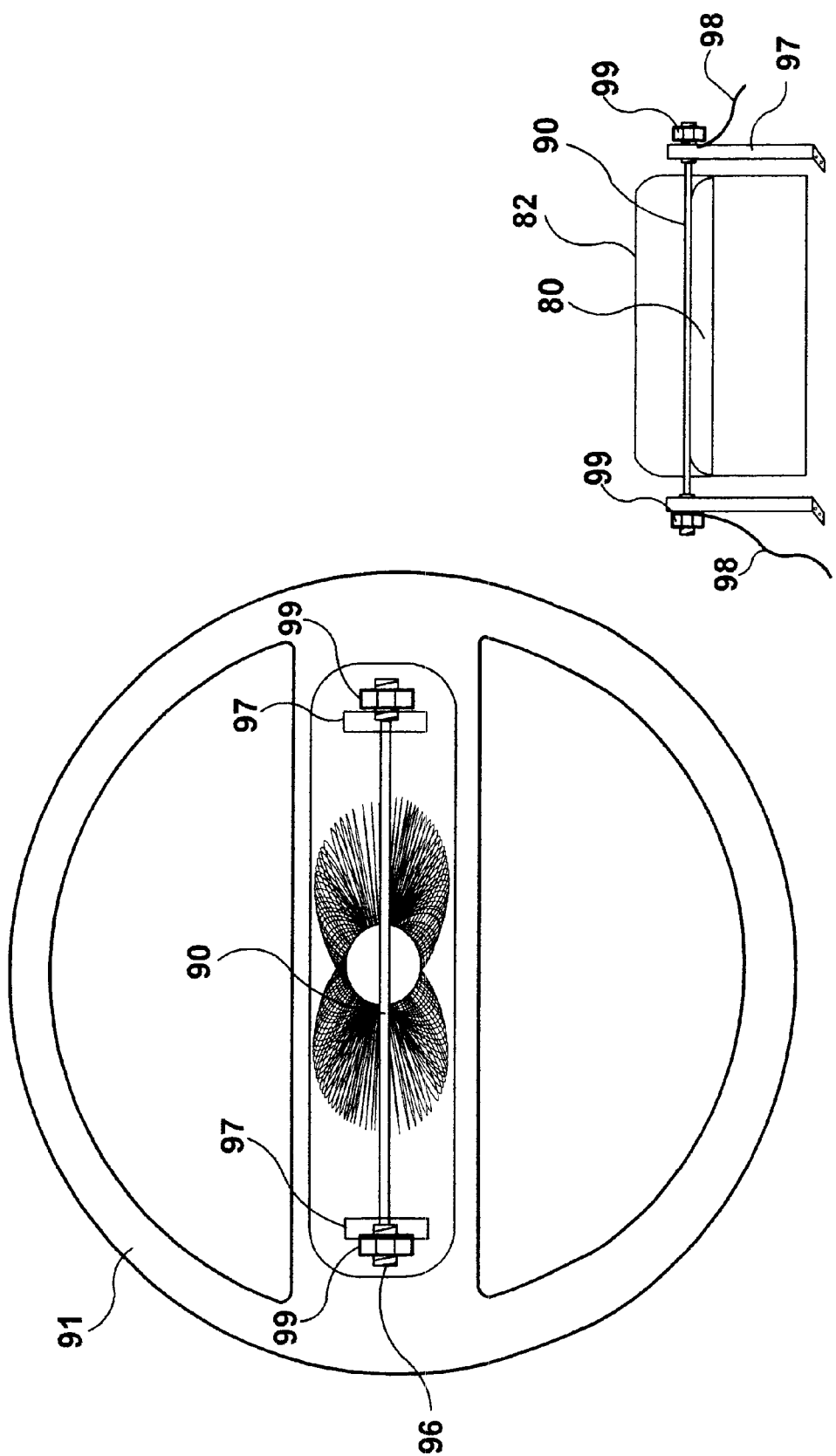

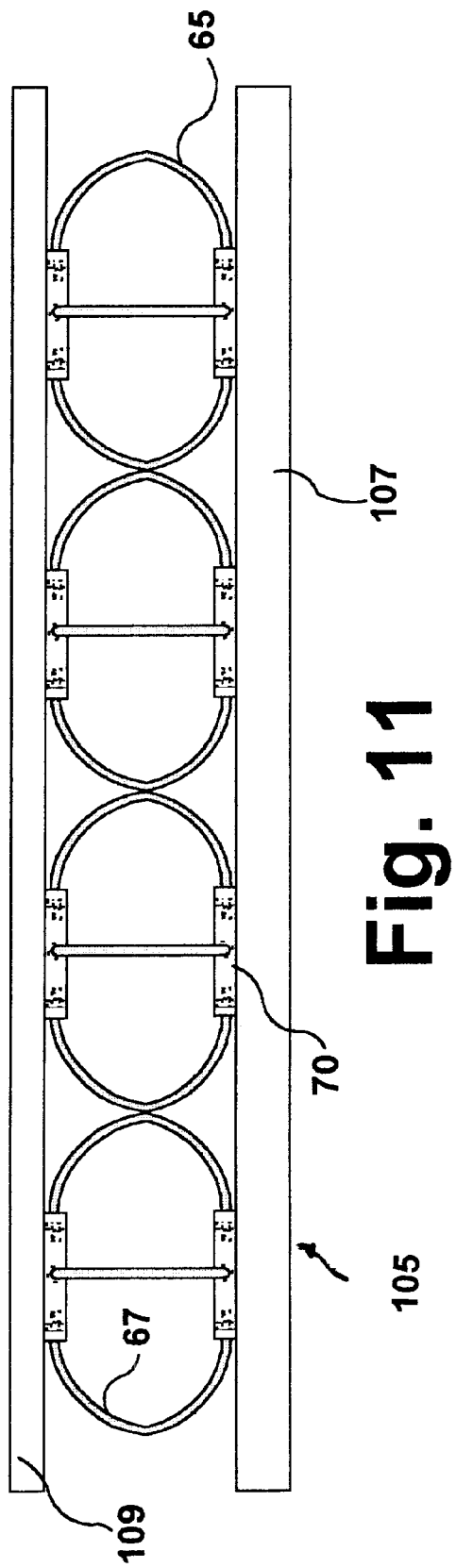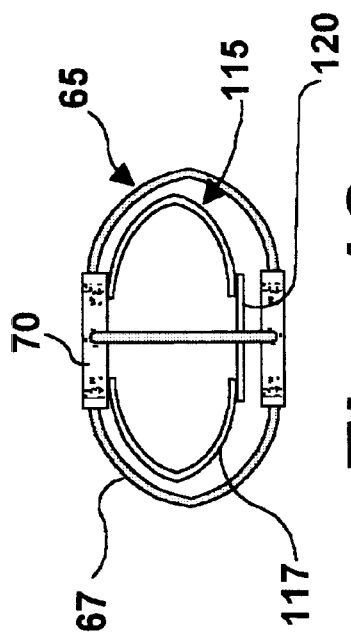

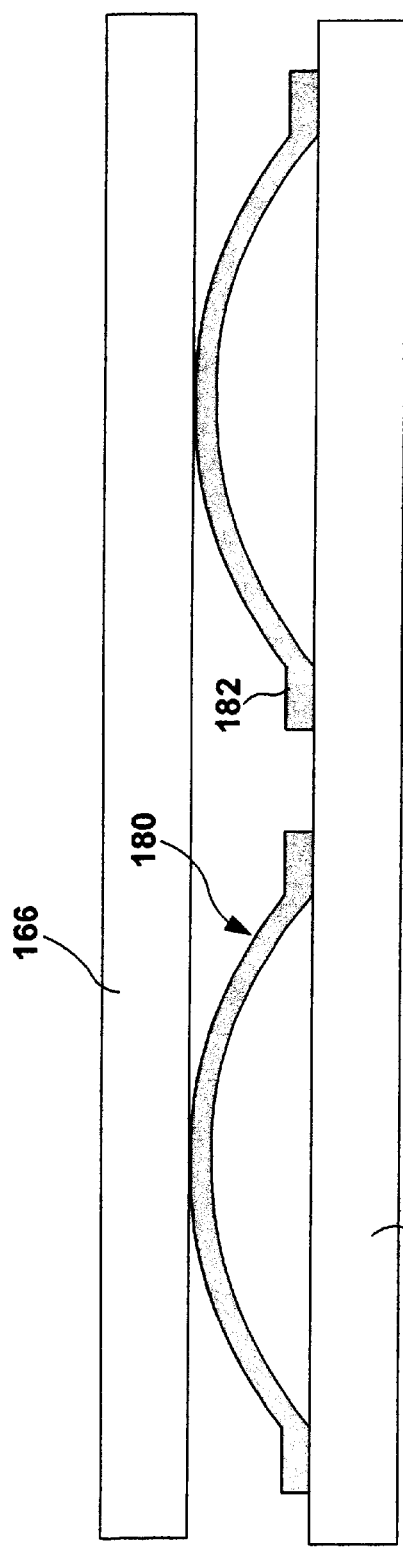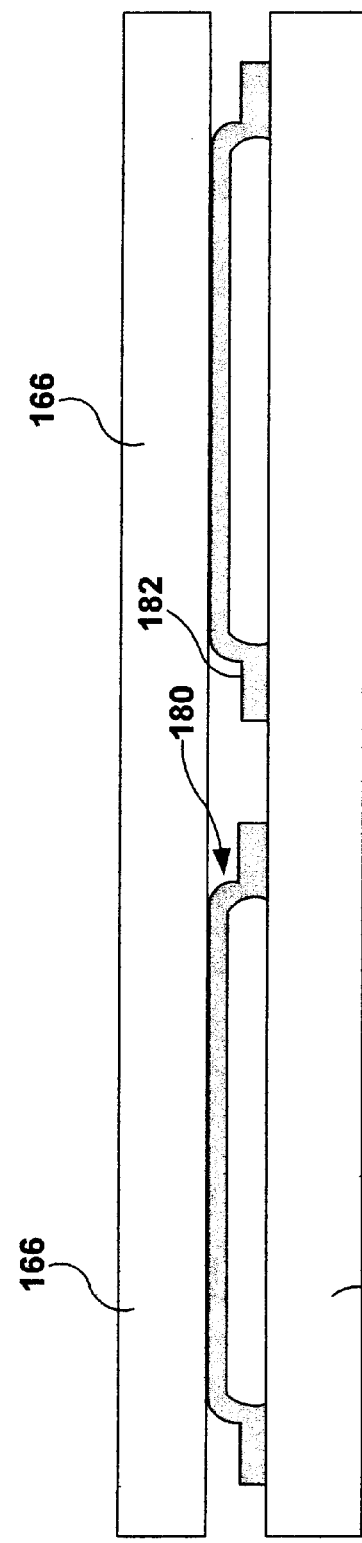

NITINOL IMPACT ABSORBERS

This application claims the benefit of provisional application No. 60/049,581, filed Jun. 13, 1997 and No. 60/049,370, filed Jun. 12, 1997.

This invention pertains to impact absorbers to protect humans, animals, equipment and cargo from injury or damage during transportation or other movement in which there is danger of destructive impact with external objects, and more particularly to protective structures for humans against impacts that otherwise would prove injurious or fatal.

BACKGROUND OF THE INVENTION

Materials and devices intended to protect delicate or sensitive equipment and body parts from damage or injury caused by impact are as old as human history. Shields, armor and pads were worn to protect soldiers and horses from blows and projectiles. Guards and pads were worn to protect players from impact injury during games and training. These protective materials and devices all use the same dual function approach to protect the delicate body from injury: prevent penetration of the soft body by hard objects, and distribute the impact over a larger area to avoid concentration of the blow in one small area that would be damaged/injured by the blow.

More modern approaches to the same problem have used the same dual function approach, while seeking to enhance a third function implicit in the earlier approaches, specifically, a gradual deceleration of the impacting object. Sports gear, such as football helmets and shoulder pads, are good examples of the classic approach and its application of the deceleration function. A hard shell presents an exterior that deflects high energy objects and/or distributes the impact therefrom to an underlying pad that further distributes the impact force over a wider area. The pad may be made with a material having a spring rate which allows the impacting force to be applied at a gradually increasing rate to the impacted body so that the body is accelerated, or the object is decelerated, at a rate that minimizes damage. Often, in bicycle helmets, for example, the pad is a foam material that offers some protection but must be replaced after an impact because the foam becomes permanently compressed and loses some of its impact protection qualities after the first impact.

Regrettably, the materials used in such impact protectors do little or nothing to absorb the energy of the impact and merely distribute the impact over a larger area or time. The full impact energy is usually delivered to the "protected" body in time/area distributed form that may still exceed the limits of the body to absorb impact.

Dampers having a spring and a hydraulic ported cylinder, most commonly found in automobile "shock absorbers", do absorb energy, but the size and cost of such dampers precludes their use in many applications, and they have a limited life because of short seal life and hydraulic fluid leakage.

Thus, the art of impact protection has long needed a simple, light-weight system that performs all three protective functions as well or better than existing impact protectors: protecting against penetration, distributing the force over a wide area, and decelerating the impacting body and accelerating the body gradually. Ideally, such a new system would also absorb impact energy and convert it from mechanical or kinetic energy to heat. Finally, such an ideal system would be inexpensive, small in size and weight, easily restored or self-restoring, and extremely durable and long lasting.

DESCRIPTION OF THE DRAWINGS

The invention and its many attendant objects and advantages will become better understood upon reading the following detailed description of the preferred embodiments in conjunction with the following drawings, wherein:

FIG. 2 is a partial sectional elevation of the head rest pad of the head rest shown in FIG. 1, showing the construction of the impact absorbers inside the pad;

FIG. 3 is another embodiment of the impact absorbing sphere in accordance with this invention in a mass production version;

FIG. 8 is a front view of the deployable impact absorbing pad installed in a motor vehicle steering wheel;

FIG. 9 is a side elevation of the deployable impact absorbing pad shown in FIG. 8, showing the fusable element holding the pad in its stowed position;

FIG. 11 is a side elevation of a bulkhead or panel pad to cushion and absorb impact of a body against the pad;

FIG. 12 is a side elevation of a two-stage wire frame sphere made in accordance with this invention, shown in its undeformed state;

FIG. 23 is a schematic plan view of a third embodiment of an impact absorbing automobile bumper mount made in accordance with this invention;

FIG. 24 is a schematic plan view of the bumper mount of FIG. 23 after an impact;

DESCRIPTION OF THE PREFERRED EMBODIMENTS

Nitinol impact absorption for absorbing mechanical energy of impact is used in accordance with this invention to provide impact protection for humans, animals, equipment and cargo. Two different types of Nitinol can be used to fabricate the assemblies: high transition type Nitinol in the Martensitic state, and low transition temperature type Nitinol in the Austenitic state (called "superelastic"). The composition of the high transition type Nitinol is 55 weight percent nickel and the balance titanium. The superelastic Nitinol has nearly identical composition, but a slight alteration of the percentage of nickel, as known by those skilled in the art, lowers the transition temperature to a range of −30° C. to 0° C. so that the material remains in the Austenitic state at most ambient temperatures.

Figure 1:
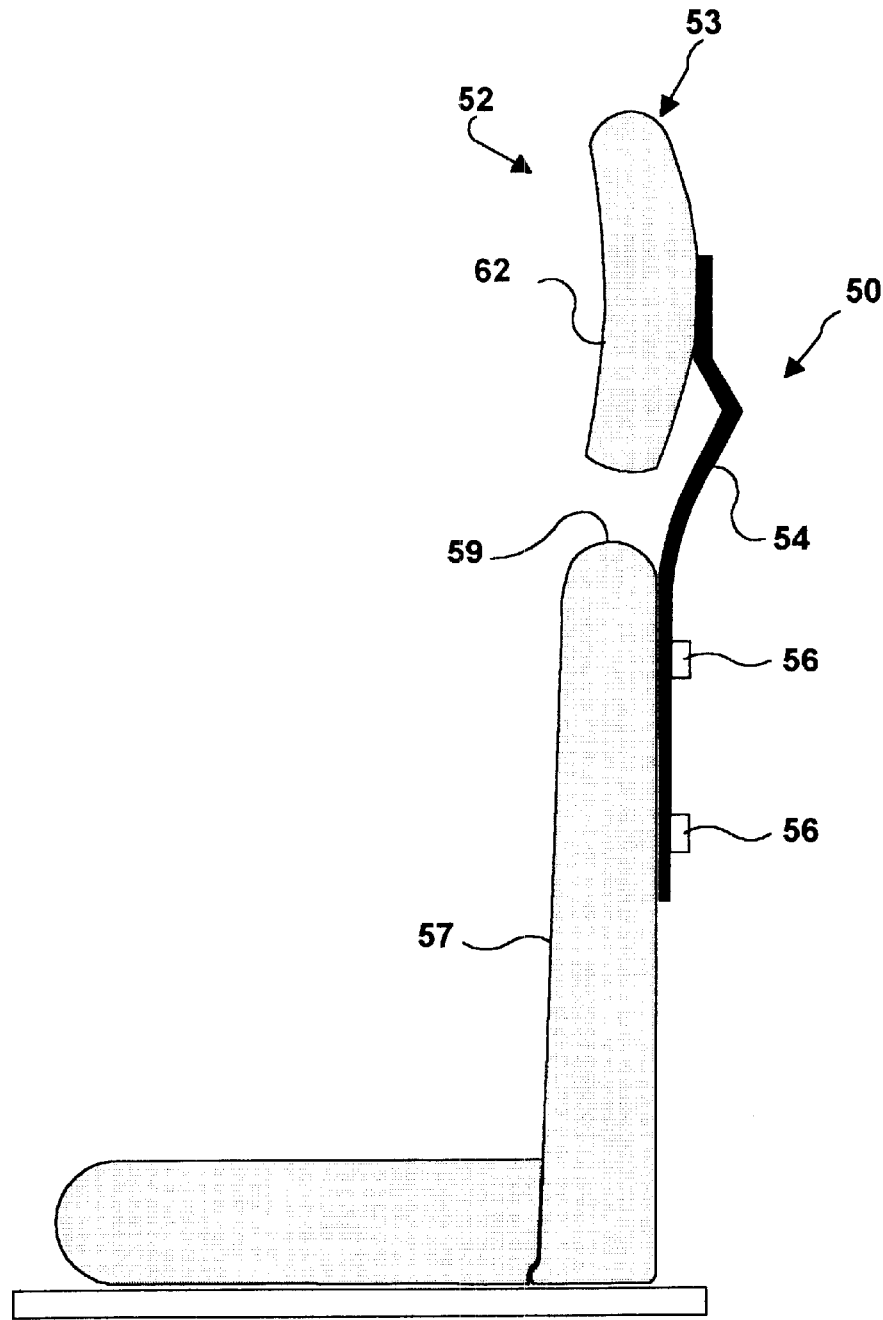
FIG. 1 is a schematic side elevation of an automobile seat having a head rest supported by a Nitinol support flexure.

In FIG. 1, an impact absorbing mount 50 for a head rest 52, for use in a vehicle such as an automobile or airplane, has a head pad 53 supported by one or more flexures 54 made of a high transition temperature form of Type 55 Nitinol. The flexures 54 comprise a formed metallic structure having at least one Nitinol member having a grounded portion in contact with the head rest 52, and an intermediate impact receiving and absorbing portion coupled between the grounded portion and the seat back. High transition temperature ensures that the Nitinol flexures will remain in their martensitic state in all normal conditions of use. In the martensitic state, Type 55 Nitinol has a relatively low yield strength of about 15 KSI which increases when subjected to cold work, and also has a very high specific damping capacity of about 40%. This combination of characteristics make Type 55 Nitinol an excellent impact absorbing material because it absorbs energy while gradually increasing in yield strength to militate against excessive deflection or grounding out against the supporting structure.

Low transition (superelastic) Nitinol has the characteristic of damping shock and vibration, although more springback does occur with the superelastic material than with the high transition temperature material. Specific shapes made from high transition temperature form of Type 55 Nitinol provide large stroke displacements while attenuating the input force. Superelastic properties (up to about 8–10% strain with full "elastic" recovery) require the imposition of cold work, and those properties can be lost by heating the material.

The flexures 54 for the head rest 52 are mounted for vertical adjustment on guides 56 on the back of the seat back 57, or in vertical slots opening in the top 59 of the seat back 57. Two or three flexures 54 will normally be used for each head rest 52, depending on the thickness and width of the flexure material. For example, three flexures 54 of superelastic Nitinol 0.125" thick and 0.5" wide provide adequate strength to support an average size head when involved in a read-end collision at a differential speed of 25 MPH.

The flexures 54 can instead be made of a high transition temperature form of Type 55 Nitinol, ensuring that the Nitinol flexures 54 remain in their martensitic state in all normal conditions of use. This material has a 40% specific damping capacity which provides the ability to absorb large amounts of energy and convert it to heat. This high transition temperature Nitinol also has the interesting property of increasing its yield strength when cold work is impressed into the material. Beginning with a low yield strength of about 15 KSI, a head rest flexure 54 of this high transition temperature form of Type 55 Nitinol will initially yield readily on impact by a driver's or passenger's head, while absorbing 40% of the input energy. As the deflection proceeds, the yield strength of the flexure material increases toward a maximum of about 180 KSI, gradually decelerating the head in a physiologically gentle manner that does not cause injurious impact of the brain against the inside of the skull, all the while absorbing 40% of the input energy. The deflection results in pseudo-plastic deformation of the flexure, but the original shape can be recovered by heating the flexure 54 to a temperature above its transition temperature which causes it to revert to its shape prior to the deformation by virtue of the "shape memory effect" of Type 55 Nitinol. The flexure could also be physically rebent to its original shape.

A third form of flexure 54 for the head rest 52 is a layered structure of two or more bars of the high transition temperature form of Type 55 Nitinol and superelastic Nitinol. Although the cost of this layered structure exceeds the cost of a simple monolithic flexure, the safety benefits to the vehicle occupants would be considered to be a bargain in a collision situation. The benefits include an increased yield strength, which can be tailored with the yield strength of the martensitic layer to provide an optimal initial yield strength and can also be optimized to provide an optimal deflection under maximum survivable impact for the vehicle in question so that the occupants head is stopped before his or her neck is broken or an otherwise fatal or incapacitating injury is sustained.

The layered structure also benefits from an additional energy absorbing mechanism, namely, friction between the layers of the layered structure. The flexure can be configured to increase the interfacial pressure between layers during flexing. As shown in FIG. 1, flexing of the flexure 54 to the rear (to the right in FIG. 1) forces the layers of the layered flexure together and absorbs additional energy through that frictional interface. The requirement for this mode of energy absorption is some differential shear motion and interfacial pressure between the two layers. Other configurations, such as sinusoidal corrugations, that provide the desired function will occur to those skilled in the art.

Many configurations of the layer structure of the flexure 54 are possible. The layers are preferably clamped together to hold them in intimate contact so that differential movement between the various layers produces the desired frictional energy absorption. The clamping mechanism can be conventional steel bands secured around the layered structure or other conventional means of securing two or more strips together with an intimate interfacial pressure while permitting limited relative shearing motion therebetween.

A superelastic layer on each side of a center martensitic, layer would provide an optimal combination of impact absorption and strength to a head rest flexure 54. The thickness and width of the layers in the flexure 54 would be easily determined by testing and/or analysis, depending on the configuration selected for the flexure. A simple scheme for securing the layers of such a flexure together is rivets or other fasteners extending through aligned slots in the several layers of the flexure. The slots are oval or canoe-shaped to minimize the notch-sensitivity of Nitinol and to allow one layer to slide with respect to adjacent layers.

The head rest pad itself has a covering of stiff material 62 such as leather or plastic that distributes the impact of an impinging object (the head of the vehicle occupant) and is provided internally with energy absorbers, shown in FIG. 2 in the form of Nitinol wire or rod spheres 65. Each sphere is made of four or more loops 67 of Nitinol wire or rod connected at opposite sides or polar regions of the sphere 65 by cruciform connectors 70. The loops 67 are coupled to the connectors 70 by threading the end of each loop 70 and attaching it into the connector with a small nut 72, shown in phantom lines in FIG. 2. The ends of the loops are threaded using the process taught in my co-pending patent application Ser. No. 08/349,872 filed on Dec. 6, 1994 and entitled "Threaded Load Transferring Attachment". The ends of the loops 67 may be attached to the connectors 70 by other techniques, other than threading. For example, the ends of the loops may be hot formed with annular grooves and attached to the connectors by swaging the connectors around the grooves. However, the threading technique is preferred in some applications because it enables the prestrain of the loops 67 to be adjusted by the torque on the nuts.

In mass production, the spheres would preferably be made in the form 75 as shown in FIG. 3 and would be made by welding the wire loops 67 to side discs 76 at opposite polar positions on the sphere. Nitinol is easily welded by fugstien inert gas (TIG) or laser using argon gas as an inert blanket. Although this sphere design and production technique does not permit adjustment of the stiffness of the spheres individually after they are assembled, the gauge, length and number of wire loops 67 provides wide design latitude to achieve the desired stiffness and stroke or amount of deflection before grounding. In addition, the material of which the wire loops 67 are made can also affect the properties of the spheres 75. If martensitic Nitinol wire is used, the energy absorption is maximized, the spheres can be plastically deformed and not spring back. Superelastic Nitinol is preferred for this application since it is elastic and also provides substantial damping.

As shown in FIG. 2, the spheres 65 can be arranged in an edge-to-edge array, or the adjacent spheres in each row and each column may be off-set slightly to allow the rows and columns of spheres to be nested more closely together. The spheres can be secured in a semi-rigid array by bands of nylon such as that used for tying wire bundles or by wire ties. However, the preferred technique is to spot weld the wire loops 67 together where they touch or overlap. The spot welding can be done rapidly by laser or TIG welding. Deformation of the spheres in the immediate path of the impinging impact causes absorption of the impact energy by the loops 67 of the spheres in the area of impact while gradually decelerating the impinging impact, and also deforms the loops of the spheres in the penumbra and even farther out from the impinging impact by virtue of the tying or welding connections between adjacent spheres holding them in a semi-rigid array.

Figure 4:
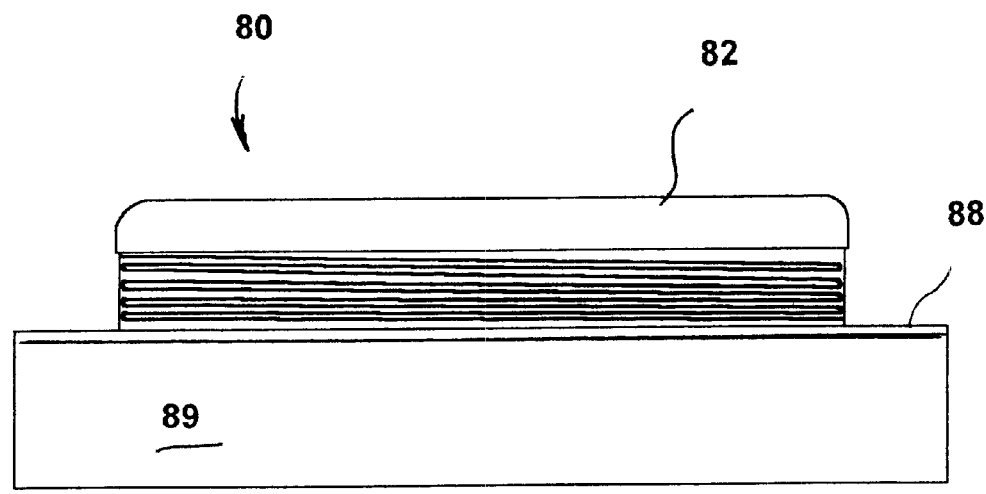
FIG. 4 is a schematic side elevation of a deployable impact absorbing structure in its stowed configuration.
Figure 5:
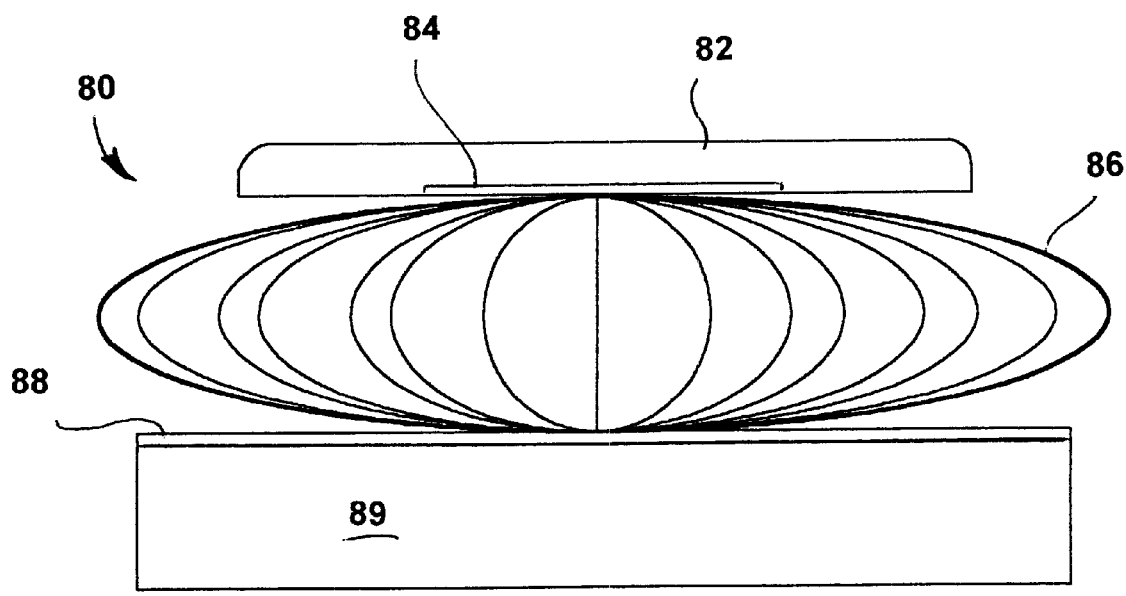
FIG. 5 is a schematic side elevation of the deployable impact absorbing structure shown in FIG. 4, in its deployed configuration.

A deployable impact absorber 80 for a motor vehicle steering wheel, instrument panel, or door jamb is shown stowed in FIG. 4 and is shown deployed in FIG. 5. The deployable impact absorber 80 includes a pad 82 on the side facing the vehicle driver or passenger. The pad 82 is made of a semi-soft material such as closed cell foam or the like that will distribute the force of impact over a wide area, on the order of a 3–4 inch diameter circle. The pad is attached to a front disc 84 to which one end of a plurality of wire loops 86 are attached, preferably by spot welding of Laser or TIG welding, as described in the embodiment of FIG. 3. The other end of each loop 86 is attached to a rear disc 88 by welding, and the impact absorber 80 is attached to a base 89 such as a steering wheel, dash board or door frame.

Figure 7:
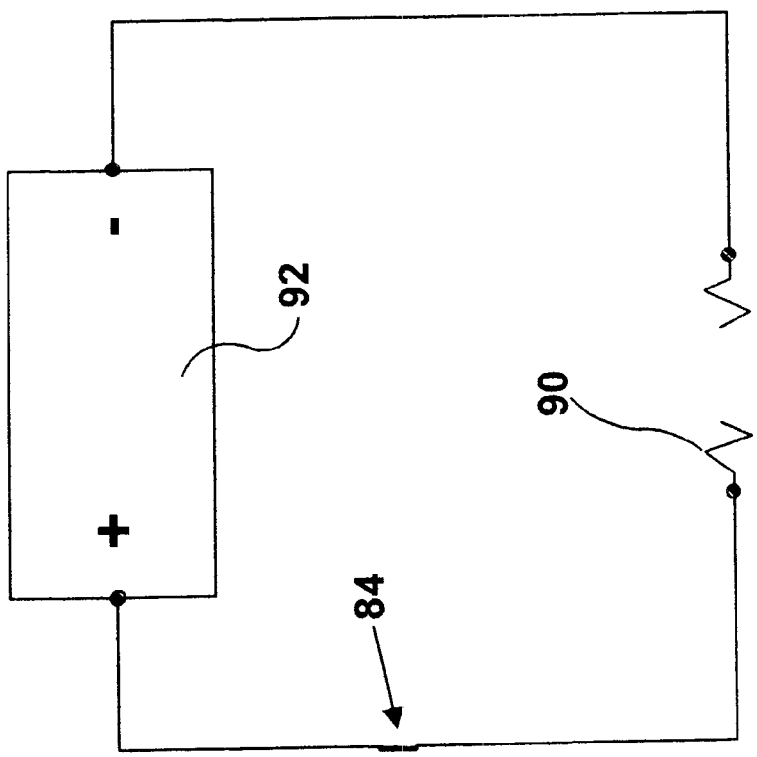
FIG. 7 is another schematic diagram for the circuit shown in FIG. 6 after the switch closes, showing the fusable element fused.
Figure 6:
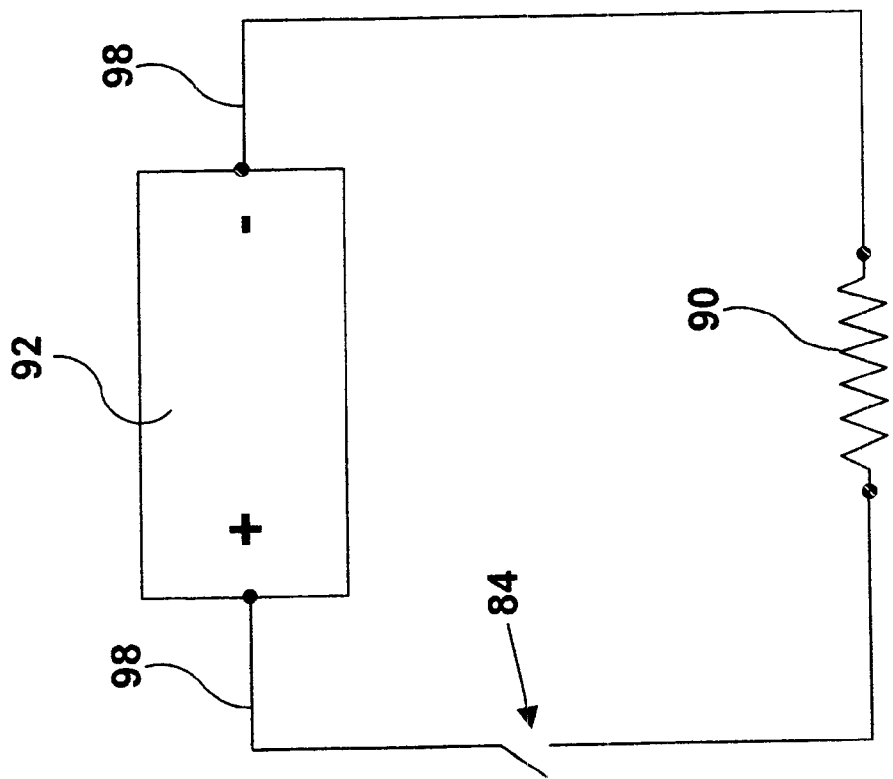
FIG. 6 is a schematic electrical diagram of a circuit for fusing a release rod for a deployable impact absorbing pad.

Deployment of the impact absorber 80 uses a simple electric circuit, shown in FIGS. 6 and 7 to fuse a Nitinol fusing element 90 shown in FIG. 8 with the deployable impact absorber 80 installed in a steering wheel 91. The fusing element 90 is connected in the circuit across the terminals of the vehicle battery 92 and a switch 84 is placed in series in the circuit. The switch could be the conventional Rollamite switch that closes on impact to complete the circuit and fuse the element 90 within a few milliseconds. Preferably, the switch 94 is a transistor switch triggered by an accelerometer that produces a signal to operate the switch 94 when the vehicle experiences an acceleration above a predetermined threshold at which collisions occur requiring deployment of the impact absorber 80.

As shown in FIG. 8, the fusing element is a length of Type 55 Nitinol rod, threaded at its ends 96 and extending between studs 97 on each side of the impact absorber 80 and across the front of the impact absorber 80 under the pad 82 in the stowed configuration of the impact absorber 80. The element 90 is reduced in diameter along its central portion or adjacent both the threaded ends 96 so the absorber 80 deploys immediately upon fusing of the element 90. Electrical connectors 98 are conveniently connected to the fusing element 90 at the threaded ends by being pinched between nuts 99 and the studs, as shown in FIG. 9.

Figure 10:
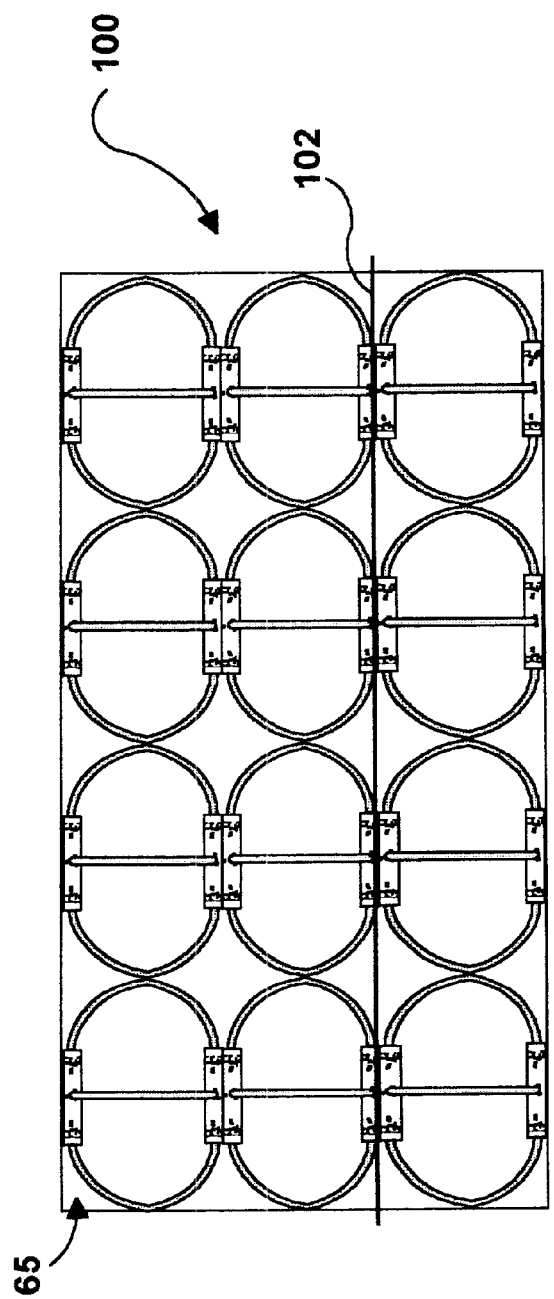
FIG. 10 is a side elevation of a layered or stacked arrangement of impact absorbing spheres, giving the assembly a greater degree of deflection before grounding.

In all uses of the spheres 65 and 75, it is contemplated that layers of such spheres may be stacked vertically as a layered impact absorber 100 as illustrated in FIG. 10 to provide a greater degree of travel or stroke before the spheres all flatten and the impacting object is grounded against the underlying support. The layers of spheres can be made with graduated stiffness so that the layered impact absorber 100 is initially soft and becomes stiffer as deflection under impact proceeds. The spheres can be welded together in an array as shown in FIG. 10, or each vertical layer can be isolated from the next adjacent vertical layer with a thin sheet of metal 102 to allow each layer to expand laterally independently of the adjacent layers, and to provide for frictional absorption of energy by relative lateral movement of adjacent layers against the intervening metal sheet.

Bulkhead panels 105, shown in FIG. 11, have a layer of spheres 65 (as shown) or 75 (as shown in FIG. 3) welded or tied together in a single layer and covered with a sheet of semi-rigid foam 107 on its front face. The spheres are attached to a thin rigid mounting 109 board by which the panel can be mounted to a bulkhead such as the bulkhead between airplane seat sections or on a marine vessel. The Nitinol rod or wire loops 67 is 30% lighter than steel so it does not impose a serious weight load, and it provides exceptional impact protection against damage to a person being thrown against the bulkhead. It would also provide similar protection to athletes if mounted in areas of likely impact, such as the wall under basketball baskets, squash and paddle ball courts, and ski lift stanchions. As in other applications mention previously, the spheres can be closely nested by slightly off-setting adjacent spheres in the rows and columns, and they may be arranged in vertical layers to provide greater stroke.

Figure 13:
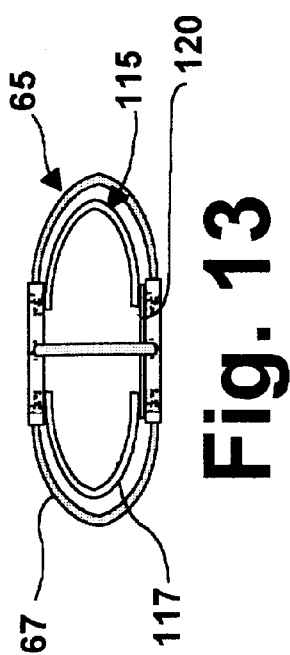
FIG. 13 is a plan view of the component shown in FIG. 12 in its deformed state.

Slightly smaller spheres 115 may be inserted in the larger spheres 65 or 75 to increase the stiffness gradient, as illustrated in FIGS. 12 and 13. One end of the loops 117 of the inner sphere 115 are attached, as by welding described above, to the connector 70 and the other ends are attached to a separate connector plate 120. The inner sphere 115 does not become operative until the outer sphere 65 is partially deformed, as shown in FIG. 13, at which time, both spheres are operative to decelerated the impacting object and absorb its kinetic energy.

Figure 14:
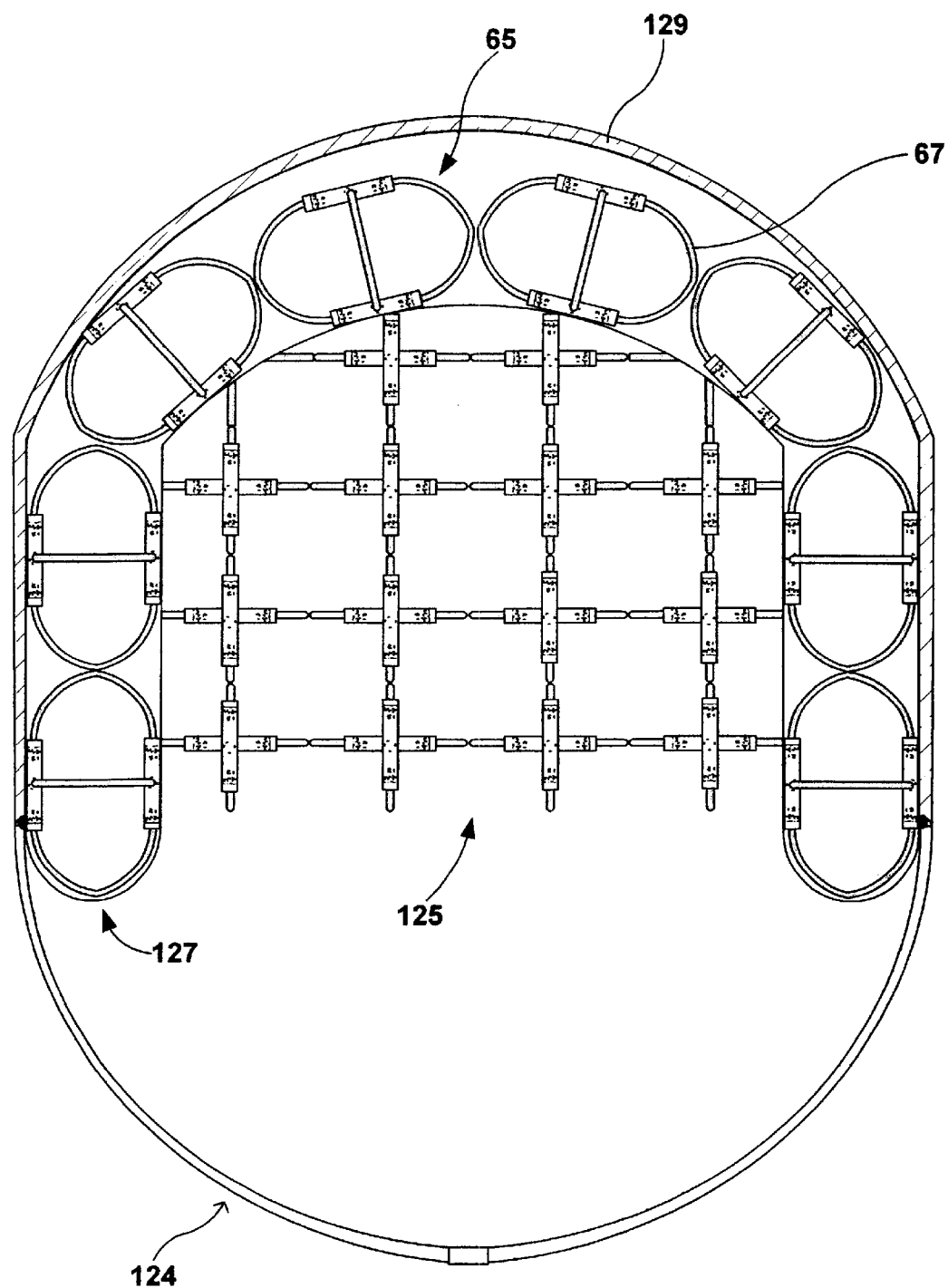
FIG. 14 is a schematic sectional plan view of a helmet made in accordance with this invention.

A helmet 124, shown in FIG. 14, includes a top layer 125 and a peripheral layer 127 of Nitinol rod or wire spheres 65 and/or 75 arranged around the inside of a hard plastic shell 129. The spheres could be nested more closely together by off-setting adjacent spheres in each row and column as described previously. A layer of semi-rigid foam (not shown in FIG. 14) provides comfort to the wearer and some distribution of the impact stress over a wider area of the wearer's head. The object of this helmet is to distribute the impact over a wide area and absorb the energy of that impact in the energy absorbing structures of the helmet 124 to minimize the physiological stress and attendant swelling of the brain caused by brain impingement against the skull.

Figure 15:
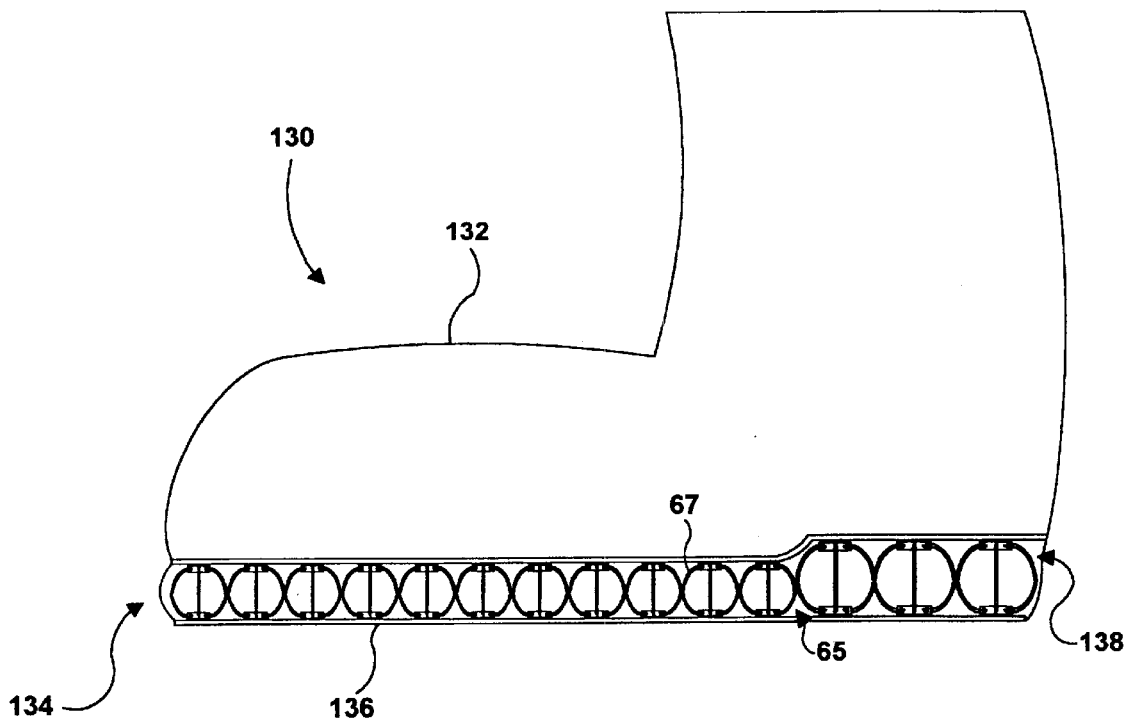
FIG. 15 is schematic side elevation of shoe or boot having an impact absorbing layer of superelastic Nitinol wire frame spheres disposed between the upper and the wear surface of the sole.
Figure 16:
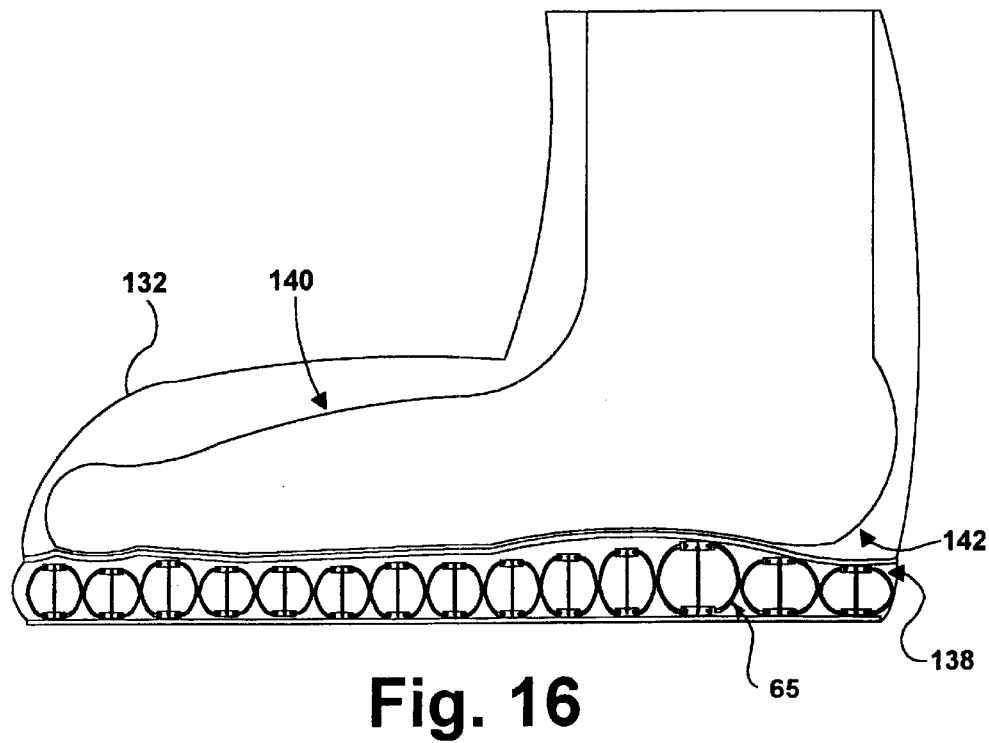
FIG. 16 is a schematic side elevation of shoe or boot shown in FIG. 15 on a foot, showing some of the superelastic Nitinol wire frame spheres in a deformed state under impact.

Turning now to FIGS. 15 and 16, a shoe 130 is shown having a conventional upper structure 132 of leather, fabric or other known shoe material. The upper 132 is attached to a sole 134 having a conventional abrasion resistant wear layer 136 of carbon impregnated rubber or other known material, and an impact absorbing layer of spheres 65 or 75. The spheres are arranged in a single layer 138 as shown with adjacent spheres attached to adjacent spheres by welding or tying the loops 67 where they touch or overlap.

The size and stiffness of the spheres can be adjusted to optimize their performance at their position under the foot 140. The area of maximum impact, under the heel 142, receive spheres of the greatest stiffness and range of deflection, and could include inner spheres 115 as shown in FIG. 12 to provide a stiffness gradient. The spheres around the peripheral region of the sole 134 are stiffer than the spheres in the center to provide stability against excessive rolling or pronating motion. The stiffness could also be adjusted to correspond to the size of the shoe 130 so that larger people in larger shoes would have stiffer soles better able to support their weight.

Figure 17:
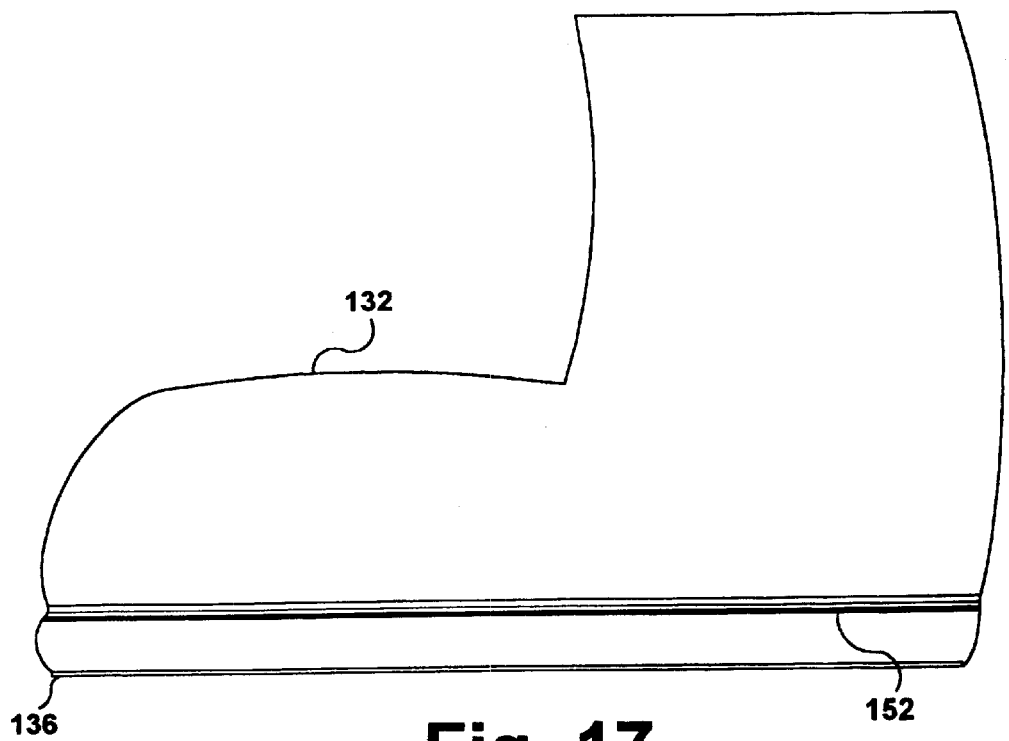
FIG. 17 is side elevation of a second embodiment of a shoe or boot with a superelastic Nitinol footbed.
Figure 18:
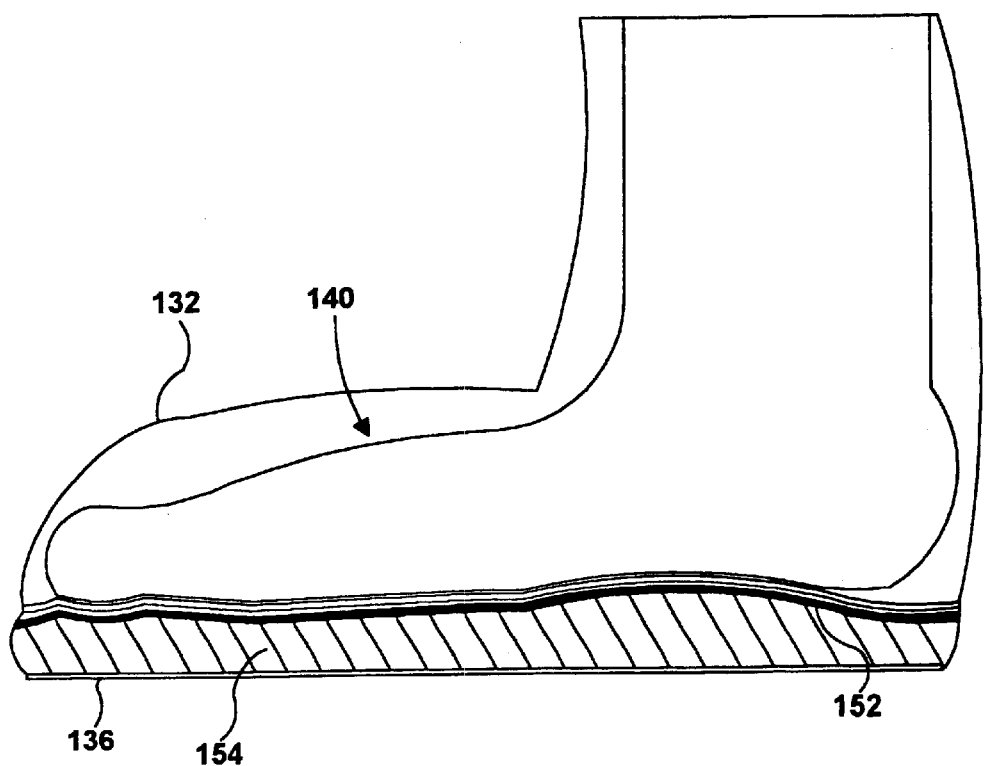
FIG. 18 is a sectional elevation of the shoe or boot shown on a foot.

Another impact absorbing shoe 150, shown in FIGS. 17 and 18, includes an upper 132 and a sole wear layer 136 as in the embodiment of FIGS. 15 and 16. A superelastic Nitinol sheet 152, hot formed to the shape of the under surface of the foot 140, is supported on a midsole 154 of conventional material such as EVA foam gel cushions or other conventional materials. The midsole 154 could also be a sphere array as shown in FIGS. 15 and 16.

The hot-formed superelastic Nitinol sheet 152 flexes with each step, absorbing impact energy and protecting the foot from injury. It flexes readily, allowing the foot to bend normally at the ball during walking or running activities and actually provides a small energy recovery during the toe-off phase of a running stride. The superelastic sheet 152 provides an additional protective function besides impact absorption, namely, protection against punctures by nails or ballistic projectiles propelled by land mines or the like.

Figure 19:
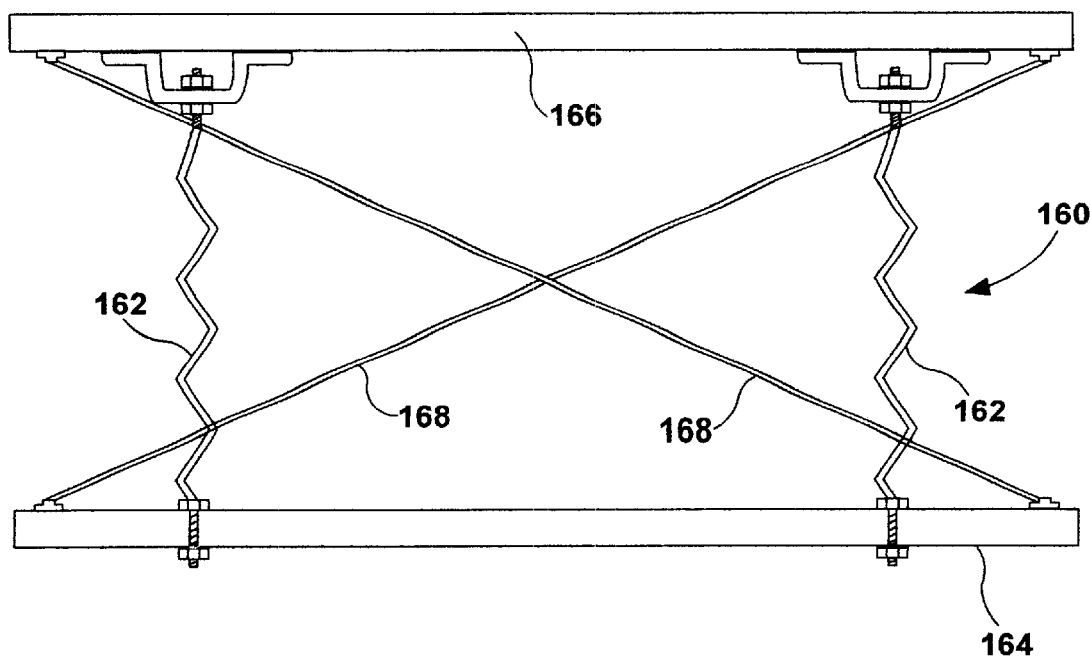
FIG. 19 is a schematic plan view of an impact absorbing bumper mount showing constraints for focusing the impact energy into the impact absorbing components.
Figure 20:
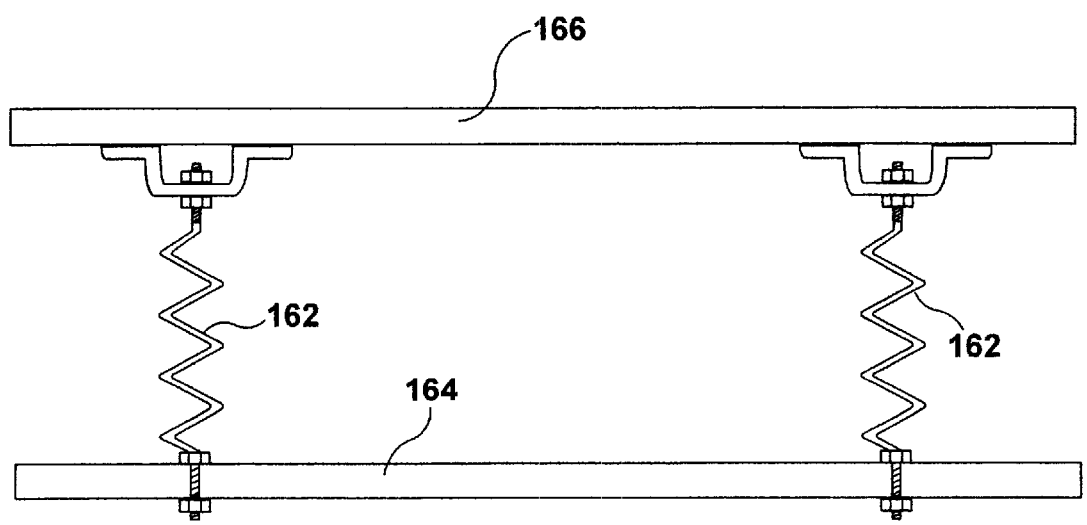
FIG. 20 is a schematic plan view of the bumper mount shown in FIG. 19 after impact.

Turning now to FIGS. 19 and 20, an energy absorbing automobile bumper support 160 is shown having two Nitinol rods 162, threaded at each end, and attached at opposite ends to the bumper 164 and frame 166 of the vehicle, respectively. The threading of the rods 162 is done in accordance with the aforesaid patent application Ser. No. 08/349,872. The rods are pre-formed in a zig-zag pattern as shown or in a sinusoidal pattern to predispose the rods to deflect under impact in an accordion fashion as shown in FIG. 20. Guides or other restraints, such as the crossed rods or cables 168 limit the lateral deflection of the bumper and supporting rods 162 in the event of an oblique impact, and focus the impact energy into the rods 162.

The rods 162 are preferably made of high transition temperature Nitinol which will remain in is martensitic state within all normal driving temperatures ranges. It is made of thick rod, on the order of about 1–2 inches thick and is formed in the martensitic state to the desired shape, such as the zig-zag shape shown in FIGS. 19 and 20. The rods are preferably formed in matched dies and heat treated to about 600° C.–800° C. while held in a fixture to set the memory shape. After a collision, the bumper support rods 162 can be restored to their memory shape by merely heating them to a temperature above the transition temperature, typically about 100° C.–115° C. The rods 162 could be replaced with rectangular cross-section bars, also formed in the zig-zag or sinusoidal shape, with the wide dimension oriented vertically. The bars would better resist any tendency of the bumper support to deflect upward or downward on impact.

Figure 21:
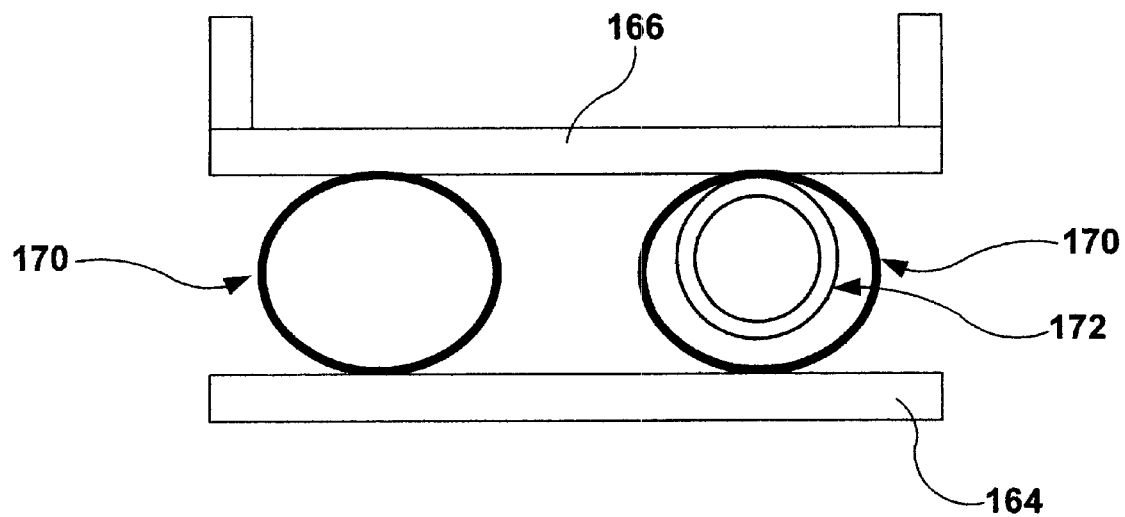
FIG. 21 is a schematic plan view of a second embodiment of an impact absorbing automobile bumper mount made in accordance with this invention.
Figure 22:
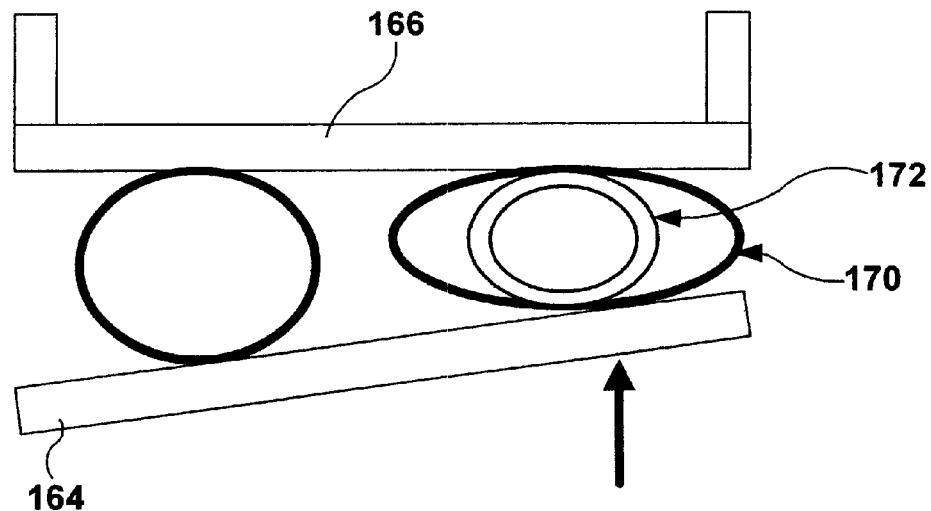
FIG. 22 is a schematic plan view of the bumper mount of FIG. 21 after an offset impact.

Another form of bumper support, shown in FIGS. 21 and 22, for stand-off mounting of a bumper 164 to the frame 166 of a vehicle, includes a pair of circular or oval shaped supporting structures 170 made of rectangular cross-section Nitinol bar stock on the order of about 2–5" wide and about ¼–½ thick, with the wide dimension of the bar stock oriented parallel to the axis of the circle (which would be vertical in the installed bumper). The Nitinol would preferably be high transition temperature Nitinol so the material would remain in its martensitic state in the usual temperature range of a motor vehicle. The manufacturing process and repair process after a collision would be the same as described for the embodiment of FIGS. 19 and 20.

In a collision the Nitinol bar stock would deform as indicated in FIG. 22, absorbing a large amount of impact energy and decelerating the impacting body. Cross restraints like the cross cable 168 could be added to prevent excessive lateral deflection in the event of an oblique impact. An inner circle or oval 172 may be used inside the main supporting structure 170, indicated as optional by showing it on one side only. The inner structure 172 would be stiffer and would begin to deflect and absorb energy only in the event of a higher energy impact. In this way, it is possible to design the impact absorbing structure with a fairly soft initial yield strength so that the deceleration of the impacting object is more gradual.

Figure 25:
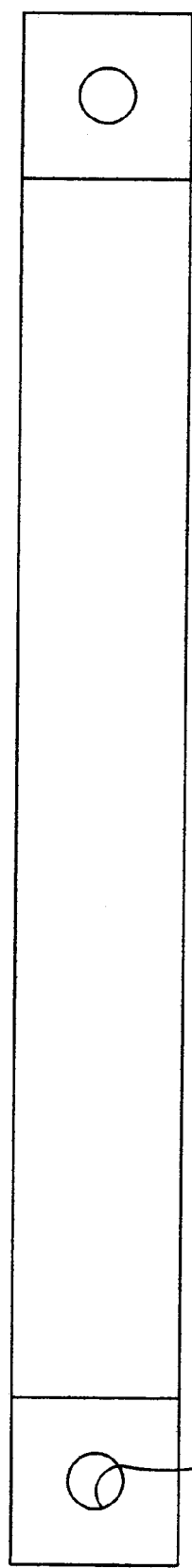
FIG. 25 is a side elevation of one of the automobile bumper mount components shown in FIG. 23.
Figure 26:
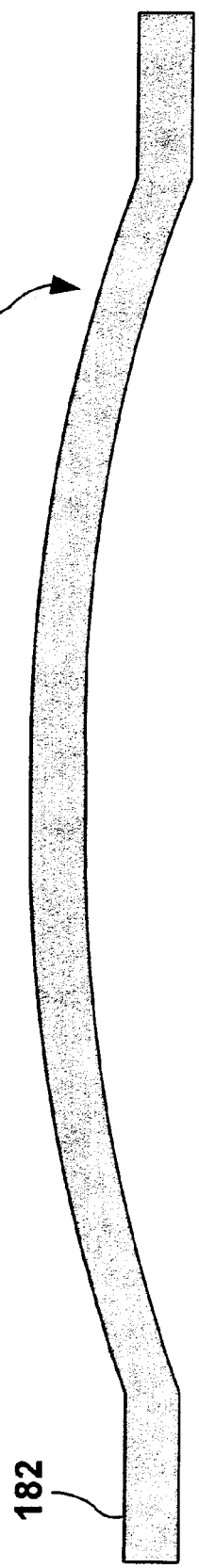
FIG. 26 is a schematic plan view of the absorber component shown in FIG. 25.

A third bumper support, shown in FIGS. 23–26, includes a pair of bumper support elements 180 in the shape of a sector of a circle and having flat flanges 182 at each end, as shown in FIGS. 25 and 26. The elements are made of heavy Nitinol bar stock about 2–5" wide and ¼–½" thick, with the wide face fastened to the frame and the bumper. The flanges 182 have holes 184 drill therethrough for attachment to the bumper 164 or the frame 166 of the vehicle, with the other of the bumper or frame bearing against the crest of the curve at the center of the element.

When a collision occurs, the bumper support element 180 flattens as shown in FIG. 24, absorbing impact energy while decelerating the impacting object. In this arrangement, no lateral bracing is needed because the design inherently provide lateral support in the event of an oblique impact. The bumper support elements shown in FIGS. 23–26 could also be used in combination with the bumper support elements shown in FIGS. 19–20 and 21–22.

The high transition temperature Nitinol has the property of transforming to a stronger form known as stress-induced martensite on imposition of cold work. Thus, a bumper made of high transition temperature Nitinol will provide an initial soft resistance to impact, but as deformation proceeds, the resistance to further deformation of the material increases from an initial yield strength of about 15 KSI up to a maximum, estimated to be about 180 KSI at ultimate yield strength. A bumper support as described thus provides an optimal ability to protect the vehicle and the bumper itself by absorbing energy of impact while gradually decelerating the impacting object. The support elements could also be made of a sandwich structure of superelastic Nitinol and high transition temperature Nitinol. The superelastic provides initial high strength and a good energy absorbing capacity, while the martensitic Nitinol provides exception energy absorbing capability and increasing yield strength.

Figures 27, 28:
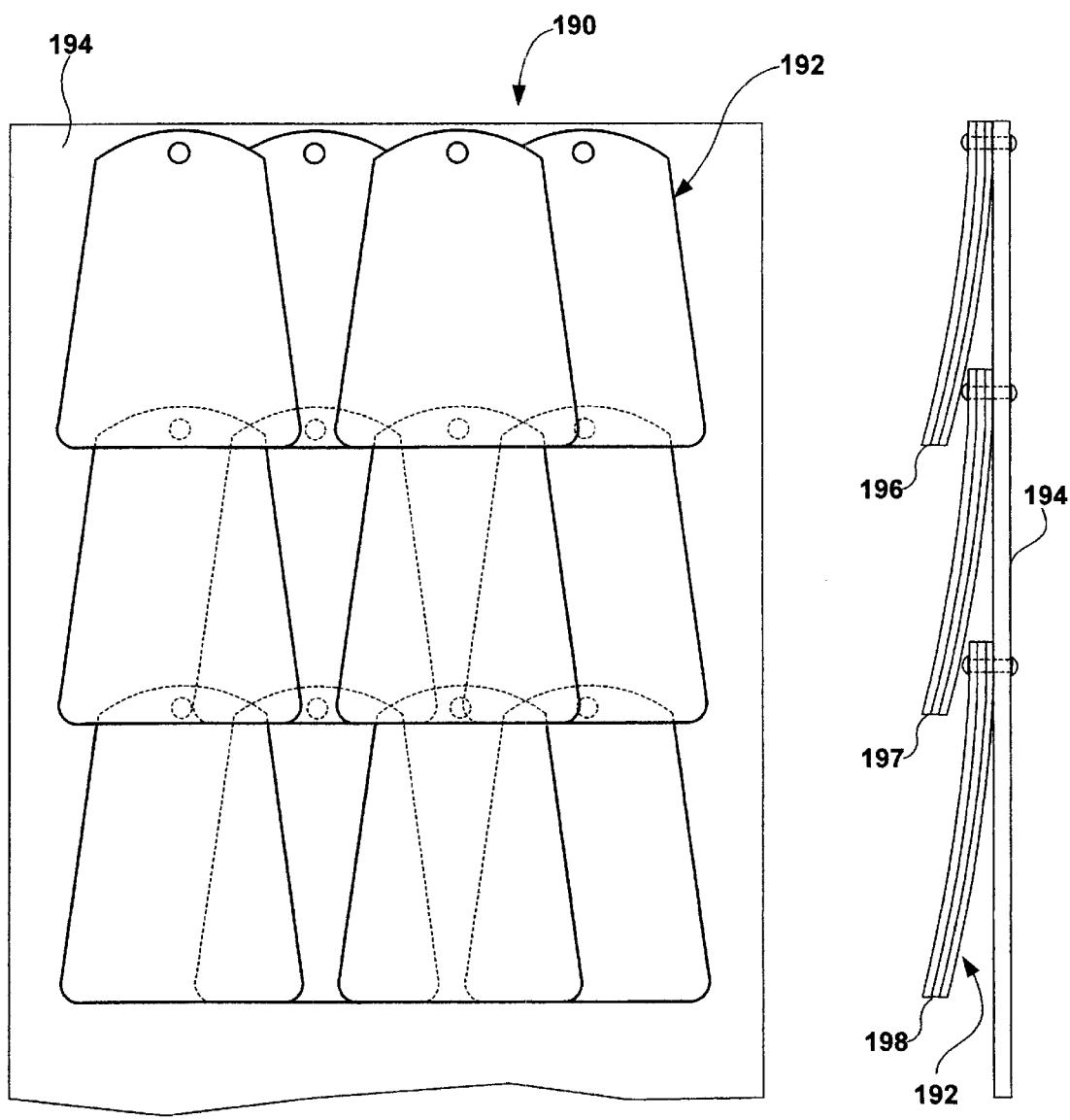
FIG. 27 is a front view of a impact absorbing ballistic vest made in accordance with this invention.
FIG. 28 is a side elevation of the impact absorbing ballistic vest shown in FIG. 27.

An impact absorbing ballistic or flak vest 190, shown in FIGS. 27 and 28, includes a series of stacked sheets 192, arranged in overlapping fashion to provide complete coverage of the protected body area, such as the torso. Each sheet in the stack 192 is about 0.10" and the stacks of sheets 192 are fastened to a supporting fabric garment such as Kevlar or Spectra cloth which itself provides a degree of protection from low velocity projectiles.

Each stack of plates 192 includes a top sheet 196 made of Type 60 Nitinol, a composition made of 60% by weight nickel and 40% by weight titanium. This top sheet is heat treated to a hardness of about 55 on the Rockwell C scale which is very tough at that hardness. The second layer sheet 197 is made of a high transition temperature form of Type 55 Nitinol that remains in the martensitic state at all time under normal conditions of use. The third layer is made of superelastic Nitinol that remains in the austenitic state under all normal conditions of use.

A ballistic projectile, on impacting the hard Type 60 Nitinol top sheet, is deformed and partially broken, and its energy is spread over a large area and transmitted to the underlying second sheet 197 before the projectile penetrates to the second sheet. The second sheet deforms, absorbing energy and converting to stress-induced martensite, thus increasing greatly in yield strength and further spreading or dissipating the energy of the projectile to the third sheet of austenitic Nitinol where its energy is further absorbed. The deformation of the plates results in shearing movement under high pressure of the plates in the stacks, further absorbing the energy of the projectile.

The combination of a three sheet stack of Type 60 Nitinol, martensitic Nitinol, and superelastic Nitinol results in a structure that has a remarkable ability to stop ballistic projectiles of an energy level that would penetrate prior art "bullet-proof" vests. Projectiles from hand guns and many rifles would fail to penetrate this combination of Nitinol plates.

Figure 29:
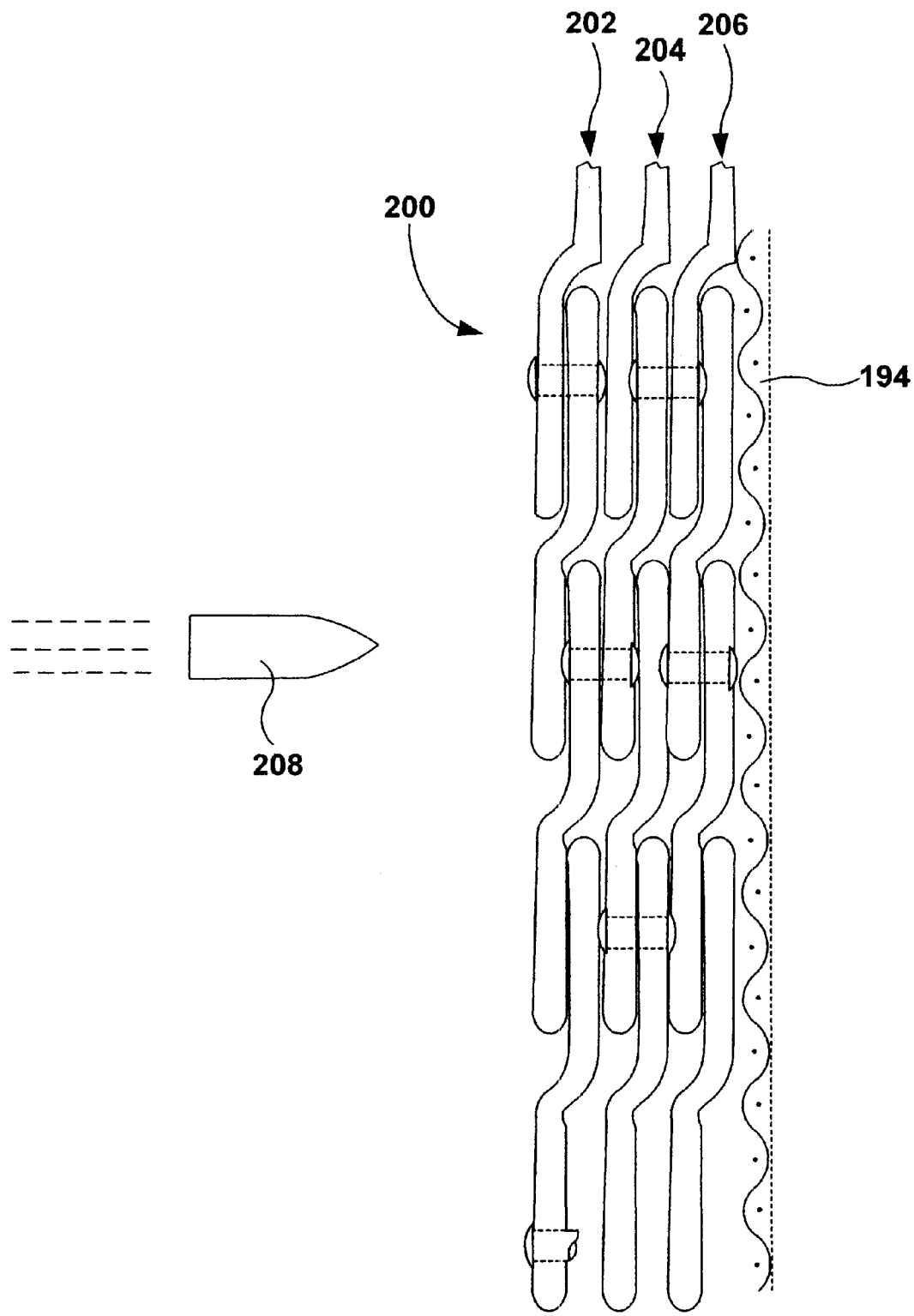
FIG. 29 is a side elevation of a second embodiment of a impact absorbing ballistic vest made in accordance with this invention.

Another embodiment of the ballistic or flak vest 200 in accordance with this invention, shown in FIG. 29, includes a first layer of plates 202 made of Type 60 Nitinol, a second layer of plate 204 made of a high transition temperature form of Type 55 Nitinol, and a third layer of plates 206 made of superelastic Nitinol. Each layer is formed with an off-set or jog to allow vertically adjacent plates to overlap without being displaced or tilted forwardly. The plates are fastened together by a minimum number of fastener so that they will slide over each other to allow the wearer to move freely and allow the plates to move relatively with respect to each other in shear when struck with a projectile 208. The functional performance of the structure is otherwise identical to the structure shown in FIGS. 27 and 28.

Obviously, numerous modifications and variations of the several embodiments described above are possible and will become apparent to those skilled in the art in light of this disclosure. Also, many functions, objects and advantages are described in the preferred embodiments, but in some uses of the invention, not all of these functions, objects and advantages would be needed, desired or attained. Therefore, contemplate the use of the invention using fewer that the complete set of noted functions and advantages. Moreover, numerous species and embodiments are disclosed herein, but not all are specifically claimed in species claims, although all are covered by generic claims. Nevertheless, it is my intention that each and every one of these species and embodiments, and the equivalents thereof, be encompassed and protected within the scope of the following claims, and no dedication to the public is intended by virtue of the lack of claims specific to any individual species.

Accordingly, it is expressly intended that all the disclosed species and embodiments, and the numerous modifications and variations, and the equivalents thereof, are to be considered within the spirit and scope of the invention as defined in the following claims, wherein I claim:

1. An impact absorber for protecting a protected item against damage or injury upon impact, comprising:
    a formed metallic structure having at least one Nitinol member having a grounded portion in contact with a first structure positioned to engage said protected item, and an impact absorbing portion operatively coupled between said grounded portion and a second structure from which said impact emanates;
    said impact absorbing portion of said Nitinol member being disposed to bend in flexural mode and having high specific damping capacity of up to about 40%.

2. An impact absorber as defined in claim 1, wherein:
    said formed metallic structure includes a plurality of Nitinol wires connected together at opposite polar regions in the form of a wire-frame sphere.

3. An impact absorber as defined in claim 1, wherein:
    said formed metallic structure includes superelastic austenitic Nitinol in a strained condition; and
    a release device for releasing said strained superelastic Nitinol structure to a deployed position at which said deployed superelastic Nitinol structure is positioned to engage and absorb energy from said protected item impacting said impact absorber.

4. An impact absorber as defined in claim 1, further comprising:
    guides for focusing said impact into said Nitinol formed metallic structure.

5. An impact absorber as defined in claim 1, wherein:
    said first structure is an automobile bumper and said protected item is an automobile chassis.

6. An impact absorber as defined in claim 5, wherein:
    said Nitinol member includes a curved deflecting portion attached to said chassis for absorbing impact energy against said bumper, and an attachment portion for fastening to said bumper.

7. A method of absorbing impact, comprising:
    interposing an impact absorbing structure between a protected item and an impacting force, said impact absorbing structure having at least one Nitinol member having a grounded portion in contact with a first structure positioned to engage said protected item, and an impact absorbing portion operatively coupled between said grounded portion and a second structure from which said impact emanates, said impact absorbing portion of said Nitinol member being disposed to bend in flexural mode and having high specific damping capacity of up to about 40%; and bending said Nitinol structure with said impacting force and absorbing significant portions of the energy in said impacting force by bending said Nitinol structure.

8. A method as defined in claim 7, further comprising:

distributing portions of said force unabsorbed by said Nitinol structure to a force distribution structure which spreads said force over a wider area than the initial area of impact.

9. A method as defined in claim 7, further comprising:

interposing a hard penetration protection layer between said impacting force and said Nitinol structure.

10. A method as defined in claim 9, further comprising:

deceleration said hard penetration protection layer at a gradual rate to spread said impact over time to better enable said protected item to withstand said impact.

11. A process of manufacturing an impact absorber for protecting a protected item against damage or injury upon impact, comprising:

selecting at least one Nitinol member having an impact absorbing portion and first and second opposed portions, said impact absorbing portion of said Nitinol member being disposed to bend in flexural mode and having high specific damping capacity of up to about 40%;

connecting said first portion of said Nitinol member to a structure that is to receive and hold said protected item, and connecting said second portion to structure from which said impact emanates;

whereby impacts from said impact emanating structure will be received by said second portion of said Nitinol structure which will cause said impact absorbing portion of said Nitinol member to bend in flexural mode and absorb up to about 40% of energy in said impact.

12. A process of manufacturing an impact absorber as defined in claim 11, wherein:

said Nitinol member is martensitic Nitinol having a high transition temperature above about 100° C.

13. A process of manufacturing an impact absorber as defined in claim 11, wherein:

said impact absorber includes a plurality of Nitinol wires connected together at opposite polar regions in the form of a wire-frame sphere.

14. A process of manufacturing an impact absorber as defined in claim 11, wherein:

said impact emanating structure is an automobile bumper; said protected item is an automobile on which said bumper is attached; and said Nitinol member is connected between said bumper and a chassis of said automobile.

15. A process of manufacturing an impact absorber as defined in claim 14, wherein:

said impact absorber comprises a first oval-shaped Nitinol annulus connected at each end of said bumper.

16. A process of manufacturing an impact absorber as defined in claim 15, wherein:

said impact absorber includes a second Nitinol annulus inside said first annulus to serve as a second stage impact absorbing member after deflection of said first annulus.

17. A process of manufacturing an impact absorber as defined in claim 14, wherein:

said impact absorber comprises two bumper support elements in the shape of a sector of a circle and having flat flanges at each end, connected at each end of said bumper, said bumper support elements being made of martensitic Nitinol having a high transition temperature above about 100° C.

18. A process of manufacturing an impact absorber as defined in claim 14, wherein:

said impact absorber comprises at least two rods or bars pre-formed in a zig-zag pattern to predispose said rods or bars to deflect under impact in an accordion fashion; and guides to limit lateral deflection of said bumper and said rods or bars in event of an oblique impact, and to focus energy of said impact into said rods.

19. A process of manufacturing an impact absorber as defined in claim 11, further comprising:

superimposing a hard and tough top sheet of Type 60 over said impact absorbing portion of said one Nitinol member;

whereby, a ballistic projectile, on impacting said top sheet, is deformed and partially broken, and energy in said ballistic projectile is spread over a large area and transmitted to said impact absorbing portion of said one Nitinol member before said projectile penetrates to said impact absorbing portion of said one Nitinol member, and said impact absorbing portion of said one Nitinol member then deforms, absorbing energy and converting to stress-induced martensite, thus increasing greatly in yield strength and further spreading or dissipating said energy of said projectile.

20. A process of manufacturing an impact absorber as defined in claim 19, further comprising:

adding a third layer sheet of superelastic Nitinol that remains in the austenitic state under all normal conditions of use, said third layer absorbing and resisting damage from said projectile which is not absorbed by said top sheet and said impact absorbing portion of said one Nitinol member.

* * * * *